(12) United States Patent
Grefalda et al.

(10) Patent No.: US 9,070,050 B2
(45) Date of Patent: Jun. 30, 2015

(54) METHODS AND SYSTEMS FOR CUSTOMIZING A PLENOPTIC MEDIA ASSET

(71) Applicant: United Video Properties, Inc., Santa Clara, CA (US)

(72) Inventors: Melvin Grefalda, San Francisco, CA (US); Richard Bullwinkle, Palo Alto, CA (US); Thomas Woods, Arlington Heights, IL (US); Jason Conness, Pasadena, CA (US); Minah Oh, Los Angeles, CA (US); Phil Golyshko, Pacifica, CA (US)

(73) Assignee: Rovi Guides, Inc., Santa Clara, CA (US)

( * ) Notice: Subject to any disclaimer, the term of this patent is extended or adjusted under 35 U.S.C. 154(b) by 136 days.

(21) Appl. No.: 13/721,460

(22) Filed: Dec. 20, 2012

(65) Prior Publication Data
US 2014/0177905 A1    Jun. 26, 2014

(51) Int. Cl.
*G06K 9/00*    (2006.01)
*G06K 9/78*    (2006.01)
*H04N 5/225*   (2006.01)

(52) U.S. Cl.
CPC ............... *G06K 9/78* (2013.01); *H04N 5/2254* (2013.01)

(58) Field of Classification Search
CPC .................................... G06K 9/00; H04N 5/00
USPC .......... 382/103, 107, 115–118, 236; 348/154, 348/155, 169, 170, 171, 172, 352
See application file for complete search history.

(56) References Cited

U.S. PATENT DOCUMENTS

| | | | |
|---|---|---|---|
| 7,889,886 B2 * | 2/2011 | Matsugu et al. | 382/103 |
| 2008/0019669 A1 * | 1/2008 | Girshick et al. | 386/117 |
| 2014/0082670 A1 * | 3/2014 | Papish | 725/45 |

OTHER PUBLICATIONS

Lytro Camera, www.lytro.com/camera, downloaded from the internet on Dec. 20, 2012; pp. 1-16.
Lytro Camera, Internet Article, https://www.lytro.com/camera; downloaded from the Internet on Apr. 12, 2013.

* cited by examiner

*Primary Examiner* — Abolfazl Tabatabai
(74) *Attorney, Agent, or Firm* — Ropes & Gray LLP

(57) ABSTRACT

Methods and systems are described for providing customized user experiences with media assets created using plenoptic content capture technology. The ability to increase the focus on different objects while the media asset is progressing may allow a user to more easily track the object. Conversely, the ability to decrease the focus on different objects while the media asset is progressing may block, or cloud the display of, the object from being seen by a user.

20 Claims, 8 Drawing Sheets

600

| TRANSMISSION FILE |
|---|

602 — <LIGHT_FIELD_FRAME_NUMBER_DF321JSKA321F>

604 —     <CURRENT_ASSET> FOOTBALL_GAME </CURRENT_ASSET>

606 —     <ASSET_PROGRESS> 1:34:00 </ASSET_PROGRESS>

608 —     <ASSET_DATETIME> 06-08-12_6:30:00 </ASSET_DATETIME>

610 —     <FRAME_DETAILS>

612 —         <OBJECT_1>

614 —             <OBJECT_1_NAME>PLAYER 27 </<OBJECT_1_NAME>

616 —             <FOCUSED> YES </FOCUSED>

618 —             <POSITION> (1,1), (3,1), (1, 3), (3,3)</POSITION>

620 —         </OBJECT_1>

622 —         <OBJECT_2>

624 —             <OBJECT_2_NAME>PLAYER 82 </<OBJECT_2_NAME>

626 —             <FOCUSED> NO </FOCUSED>

628 —             <POSITION> (5,4), (7,4), (5,6), (7,6)</POSITION>

630 —         </OBJECT_2>

632 —     </FRAME_DETAILS>

634 — </LIGHT_FIELD_FRAME_NUMBER_DF321JSKA321F>

METHODS AND SYSTEMS FOR CUSTOMIZING A PLENOPTIC MEDIA ASSET

BACKGROUND

Recent technologic advancements have changed the way media assets, for example, movies, television programs, games, etc. are viewed by a user. In addition to allowing a user to select different formats, for example, a high-definition format or a standard-definition format, current media assets may also have other features that allow a user to further interact with, or be immersed in, a media asset. For example, three-dimensional films allow a user to feel as if the media asset is no longer constrained by a display screen; interactive games allow a user to feel as if he or she is part of the media asset; and different quality formats allow a user to customize the media asset based on his or her viewing preferences.

SUMMARY OF THE DISCLOSURE

Accordingly, methods and systems are described herein for providing customized user experiences with media assets created using plenoptic content capture technology. Specifically, a plenoptic content capture device is a camera and/or video recording device constructed with an internal microlens array to capture 4D light field information. The light field information can be used to generate multiple light field frames corresponding to a single frame of the media asset, with each light field frame focusing on a different object found in the frame of the media asset. The ability to increase the focus on different objects while the media asset is progressing may allow a user to more easily track, or focus on, the object. Conversely, the ability to decrease the focus on different objects while the media asset is progressing may block, or cloud the display of, the object from being seen by a user.

In some embodiments, a media application may process the media asset to determine particular objects to keep in, or out, of focus (or a particular level of focus) based on a user (e.g., a user input or selection). For example, in some embodiments, a media application may receive a user selection of an object (e.g., a player in a televised football game) that the user wishes to remain in focus, irrespective of what is in focus in the default frame of the media asset. Maintaining the focus on the particular player may allow the user to more easily track or view the player during the progression of the media asset.

In some embodiments, the media application may receive a user selection of an object (e.g., a character in a movie) during a particular scene (e.g., a scene portraying bodily harm to the character) and keep the object out of focus during the scene (e.g., to prevent the user from viewing the bodily harm to the character). In some embodiments, the ability to keep objectionable objects out of focus may act as a type of content (or parental) control feature.

In some embodiments, the media application may process the media asset (e.g., using object recognition technology), or data associated with the media asset (e.g., content descriptions, content ratings, subtitle data, user-generated data, data received via a social network, etc.), to determine the content or objects currently appearing in the progression of the media asset. For example, the media application may process the media asset, and the light field frames corresponding to each frame of the media asset, to determine, without user input, particular objects (e.g., a player in a football game that is part of a user's fantasy football team or a favorite actor of the user as determined by a user profile) to highlight by keeping in focus. Additionally or alternatively, the media application may compare the objects and content of the media asset to determine whether or not any objects should be kept out of focus, including the duration, during the progression of the media asset.

In some embodiments, the objects in focus (or out of focus) in the media asset may vary throughout the progression of the media asset. For example, in some embodiments, a default media asset frame, or series of default media asset frames may be displayed. During the progression of the media application (e.g., after receiving a user input or upon determining that a user would likely prefer a different object to be in focus), the media application may modify or replace a default media asset frame to generate/display a light field frame featuring the object in an alternative focus. In some embodiments, after the display of the corresponding light field frame, or a series of corresponding light field frames, the media application may return to displaying the default media asset frames. For example, after the object that was the subject of the alternative focus is no longer displayed, the media application may return to displaying the default media asset frames for the remainder of the progression of the media asset or until the object is displayed again.

In some embodiments, the data describing the objects, and the position of those objects, including whether or not the objects are in focus (or are clear at a particular level of focus) in the default media asset frame and/or each light field frame may be received and/or generated by the media application. In some embodiments, the data may be generated at a headend and transmitted and/or stored with the media asset. In some embodiments, the media application may generate the data locally (e.g., using object recognition technology) during (or before) the progression of the media asset.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 is an illustrative data structure of data that describes the frame of the media asset, including the objects and positions of the objects in the frame in accordance with some embodiments of the disclosure;

DETAILED DESCRIPTION OF DRAWINGS

Figure 1A:
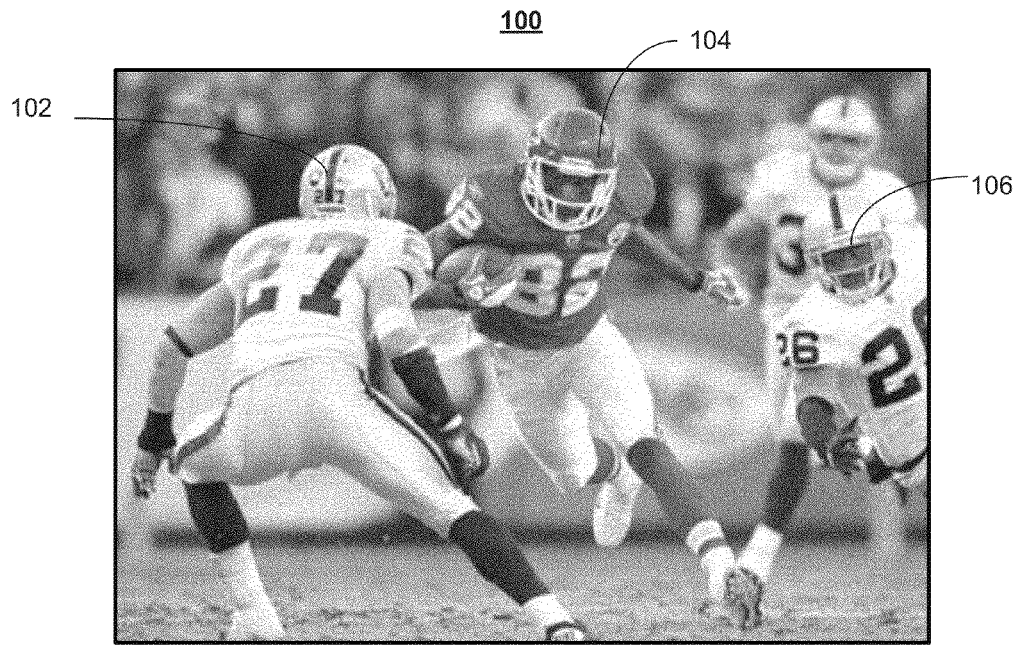
FIG. 1A shows an illustrative example of a default media asset frame in which several objects are displayed in accordance with some embodiments of the disclosure.

Methods and systems are described herein for customizing a user experience with media assets created using plenoptic content capture technology. As used herein, a "plenoptic content capture device" refers to a device capable of capturing 4D light field information for an image or video. The plenoptic content capture device may use any means necessary to capture the 4D light field, including, but not limited to, placing a video/image sensor behind a microlens array. In some embodiments, the video/image sensor may capture data (e.g., using the magnitude and vector of a light field) regarding objects that are not in focus of the microlens array. The data may be used to determine the depth of the objects that are not in focus, and subsequent processing may be able to re-focus the image and/or video on the objects. Systems and methods for acquiring, editing, generating and outputting video data using a plenoptic content capture device are discussed in greater detail in connection with Pitts et al., U.S. Pat. No. 8,279,325, issued Oct. 2, 2012, which is hereby incorporated by reference herein in its entirety.

As used herein, a "focus," "focal point," or "focus point" refers to a point where the light rays originating from a point on an object converge. As used herein, an object (or the image of the object) is "in focus" if light from the object converges in the image displayed to a user. Conversely, an object (or the image of the object) is "out of focus" if light from the object does not converge in the image displayed to a user.

As used herein, a "default media asset frame" is a frame that features predetermined objects in focus as selected by a content provider. Each default media asset has corresponding light field frames, in which an alternative focus or focal point is used. The effect of using an alternative focus or focal point is that object that did not appear in focus in the default media asset frame may now appear in focus. To display objects, which may not be in focus in the default media asset frame, in focus to a user, the media application may replace or modify a default media asset frame with a corresponding light field frame.

As used herein, a "light field frame" refers to a frame of a media asset that features a different focus or focal point, or an object with a different level of focus, than the corresponding default media asset frame. A light field frame may be received from a content provider (e.g., content source 416 (FIG. 4)) or may be generated by the media application through modifications to the default media asset frame. For example, in some embodiments, each default media asset frame may have a set of corresponding light field frames, and each of the corresponding light field frames may include a different focus or focal point.

Additionally or alternatively, each light field frame may include a different level of focus (e.g., in focus, out of focus, or partially in or out of focus) for each object in the default media asset frame. A user may receive the light field frames by modifying the default media asset frames of the media asset (e.g., via re-focusing the default media asset frames as the media asset progresses) to generate the light field frames or by replacing the default media asset frames with corresponding light field frames which have a desired object in focus, while the media asset progresses.

As used herein, an "object" refers to any entity, item, or feature represented in an image or video for which the media application may retrieve/generate a light field frame including the entity or feature in an alternative focus. For example, an object may be a character or actor in a media asset (e.g., a player in a televised football game). Additionally and/or alternatively, an object could be an item used by a character in a media asset (e.g., a football used by a player in a televised football game).

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Media applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices which, traditionally, they did not access. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front-facing screen and a rear-facing screen, multiple front screens, or multiple angled screens. In some embodiments, the user equipment device may have a front-facing content capture device and/or a rear-facing content capture device. On these user equipment devices, users may be able to navigate among and locate the same content available through a television. Consequently, a media application may be available on these devices as well. The application provided may be for content available only through a television, for content available only through one or more of other types of user equipment devices, or for content available both through a television and one or more of the other types of user equipment devices. The media applications may be provided as on-line applications (i.e., provided on a website), or as stand-alone applications or clients on user equipment devices. Various devices and platforms that may implement media applications are described in more detail below.

FIG. 1A shows an illustrative example of a default media asset frame in which several objects are displayed in accordance with some embodiments of the disclosure. In FIG. 1A, frame 100 shows object 102, object 104, and object 106 in varying degrees of focus. In some embodiments, frame 100 may represent a default media asset frame as received from a content provider (e.g., content source 416 (FIG. 4)). In some embodiments, frame 100 may be one of a plurality of default media asset frames that when shown in series creates a media asset.

Figure 1B:
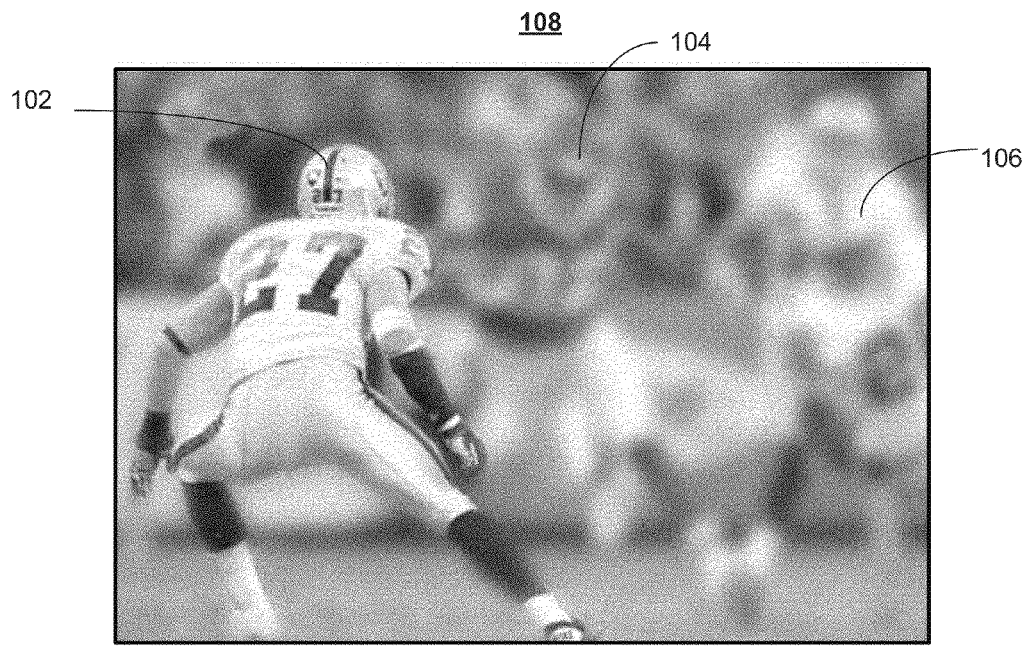
FIG. 1B shows an illustrative example of a light field frame corresponding to the default media asset frame shown in FIG. 1A in which several objects have an alternative focus in accordance with some embodiments of the disclosure.

FIG. 1B shows an illustrative example of a light field frame corresponding to the default media asset frame shown in FIG. 1A in which several objects have an alternative focus in accordance with some embodiments of the disclosure. In FIG. 1B, frame 108 shows object 102, object 104, and object 106. In contrast to frame 100, the focus of frame 108 is different than the focus of frame 100. In frame 108, object 102 is in focus, whereas object 104 and object 106 are out of focus. For example, as described below, in some embodiments, frame 108 may be in response to a user selection (e.g., via user input interface 310 (FIG. 3)) of object 102.

In some embodiments, the media application may generate, or replace frame 100 with, frame 108 based on user selection or on a determination that a user would prefer object 102 to be shown in focus. For example, in some embodiments, a media application may receive a user selection of an object (e.g., a player in a televised football game) that the user wishes to remain in focus irrespective of what is in focus in the default media asset frame. To indicate that object 102 is selectable, in some embodiments, the media application may highlight or otherwise alert the user to the fact that there are corresponding light field frames featuring the indicated object in focus. The media application may also determine, via a comparison with a user profile and media data (e.g., as described in relation to FIG. 6 below) that the object (e.g., object 102) is of particular importance to the user. For example, object 102 may represent a player of whom the user is a fan or a player who is on the user's fantasy sports team. Furthermore, as the media asset progresses, the user may desire the media application to keep the player in focus, allowing the user to more easily track or view the player during the progression of the media asset.

In some embodiments, the media application may automatically, without user input, determine a particular object is of more interest to a user and re-focus the default media asset frame or replace the default media asset frame with a light field frame so that the particular object is in focus. For example, the media application may reference a user profile, which contains information regarding objects in the media asset (e.g., players on the user's fantasy football team, the favorite actors of the user, etc.). In some embodiments, the media application may retrieve media data (e.g., as described in relation to FIG. 6 below) and compare the media data to the user's profile or the user's customized media application settings. Based on this comparison, the media application may customize the media asset that is displayed to the user based on the user's preferences.

For example, in some embodiments, the media application may process the media asset (e.g., using object recognition technology), or data associated with the media asset (e.g., content descriptions, content ratings, subtitle data, user-generated data, data received via a social network, etc.), to determine the content or objects currently appearing in the progression of the media asset. The media application may then compare the objects currently appearing in the progression of the media asset to the user preferences in the user profile. Based on the comparison, the media application may process the media asset, and the light field frames corresponding to each frame of the media asset, to determine, without user input, particular objects (e.g., a player in a football game that is part of a user's fantasy football team or a favorite actor of the user as determined by a user profile) to highlight by keeping the object in focus, including determining the duration.

Figure 3:
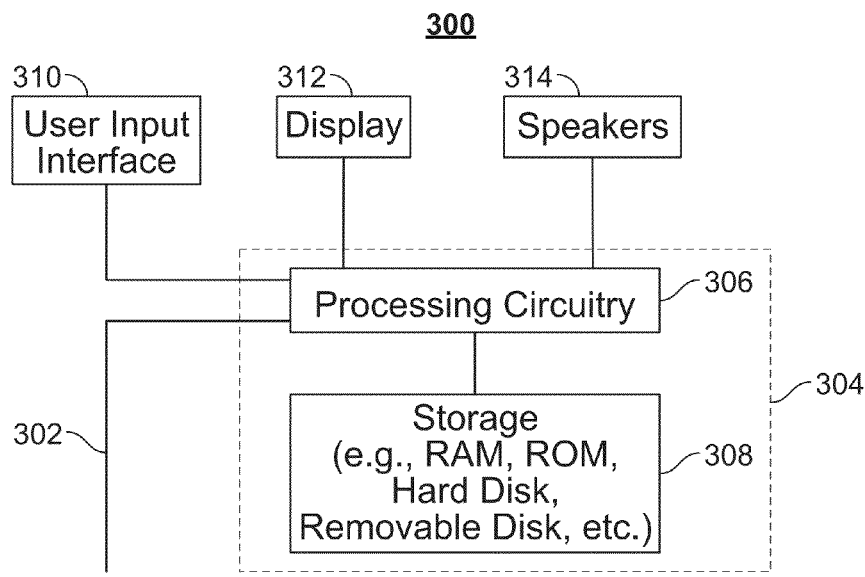
FIG. 3 is a block diagram of an illustrative user equipment device in accordance with some embodiments of the disclosure.
Figure 4:
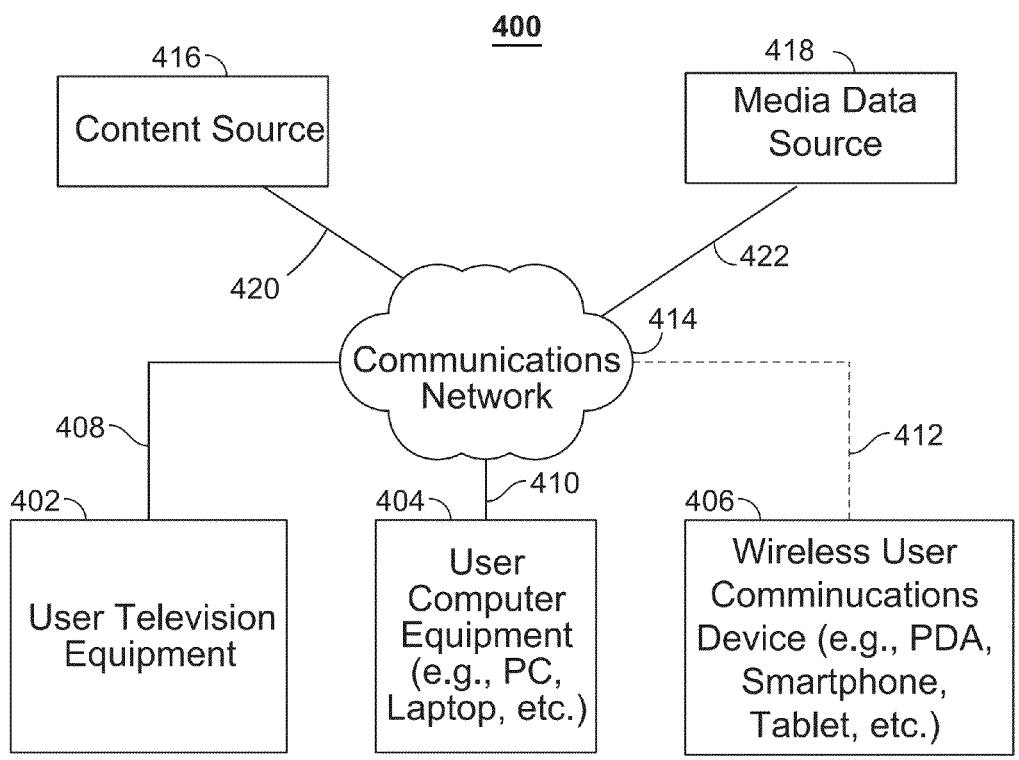
FIG. 4 is a block diagram of an illustrative media system in accordance with some embodiments of the disclosure.

It should be noted that frame 100 and/or 108 may appear on any of the devices shown and described in FIGS. 3 and 4. In addition, frame 108 may be generated/retrieved using one or more steps, or a combination of one or more steps, of the processes shown and described in FIGS. 7 and 8.

Figure 2A:
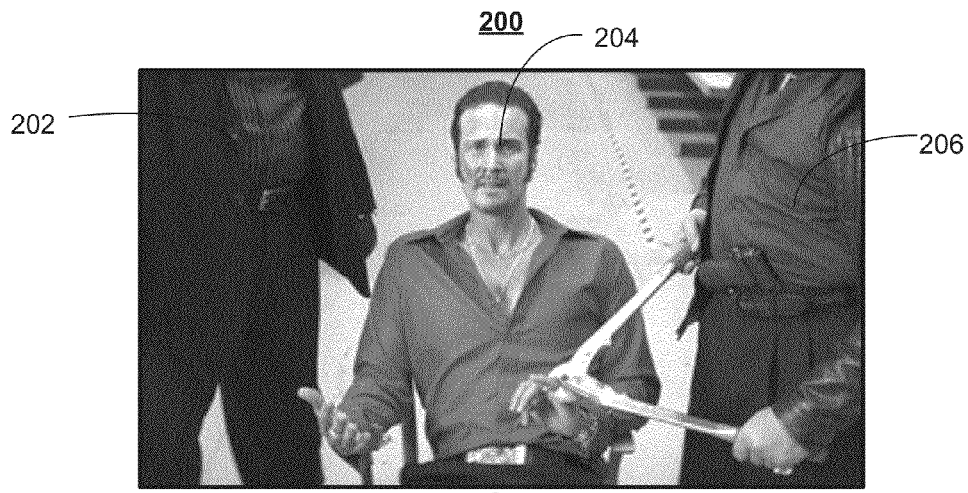
FIG. 2A shows an illustrative example of a default media asset frame in which several objects are displayed in accordance with some embodiments of the disclosure.

FIG. 2A shows an illustrative example of a default media asset frame in which several objects are displayed in accordance with some embodiments of the disclosure. In FIG. 2A, frame 200 shows object 102, object 104, and object 106 in varying degrees of focus. In some embodiments, frame 200 may represent a default media asset frame as received from a content provider (e.g., content source 416 (FIG. 4)). In some embodiments, frame 200 may be one of a plurality of default media asset frames that, when shown in series, creates a media asset.

Figure 2B:
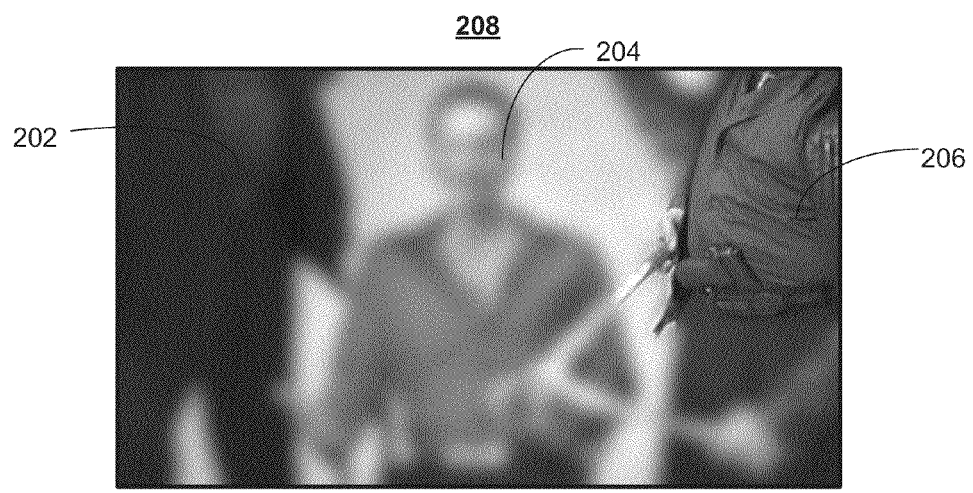
FIG. 2B shows an illustrative example of a light field frame corresponding to the default media asset frame shown in FIG. 2A in which several objects have an alternative focus in accordance with some embodiments of the disclosure.

FIG. 2B shows an illustrative example of a light field frame corresponding to the default media asset frame shown in FIG. 2A in which several objects have an alternative focus in accordance with some embodiments of the disclosure. In FIG. 2B, frame 208 shows object 202, object 204, and object 206. In contrast to frame 200, the focus of frame 208 is different than the focus of frame 200. In frame 208, object 202 and object 204 are not in focus, whereas object 206 is in focus. In some embodiments, frame 208 may be the result of the media application interpreting a content control feature. The user may indicate to the media application to render all objectionable content out of focus or to replace default media asset frames featuring objectionable content/objects with corresponding light field frames in which the objects are out of focus.

Figure 2C:
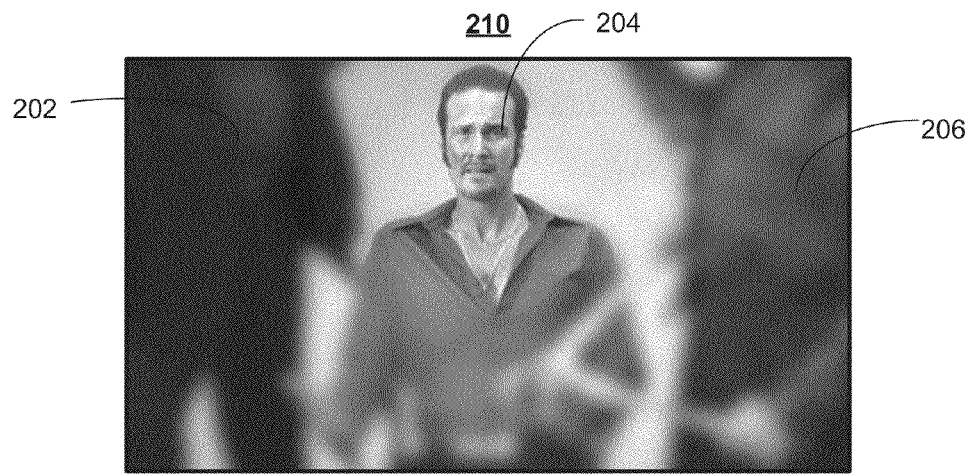
FIG. 2C shows an illustrative example of a light field frame corresponding to the default media asset frame shown in FIG. 2A and the light field frame shown in FIG. 2B in which several objects have an alternative focus in accordance with some embodiments of the disclosure.

FIG. 2C shows an illustrative example of a light field frame corresponding to the default media asset frame shown in FIG. 2A and the light field frame shown in FIG. 2B in which several objects have an alternative focus in accordance with some embodiments of the disclosure. In FIG. 2C, frame 210 shows object 202, object 204, and object 206. The focus of frame 210 is different than the focus of frame 200 and frame 208. In frame 210, object 202 and object 206 are not in focus, whereas object 204 is in focus. In some embodiments, frame 210 may be a further result of the media application interpreting a content control feature.

In some embodiments, the media application may generate (or replace frame 200 with) frame 208 or frame 210 based on a user selection or on a determination made by the media application according to a content (or parental) control feature. The generated or replaced frame may display the objectionable object out of focus. For example, in some embodiments, the media application may compare the content of a media asset to a user profile and/or content control settings to determine whether or not an object should be shown out of focus (or in focus). By showing an object out of focus, a user may not have to view objectionable content. Furthermore, showing a feature out of focus is less distracting than covering an object with an on-screen overlay. In addition, a user does not lose the context of the scene as would happen with removing or editing the scene from the media asset. For example, the "clouded" view of displaying an object out of focus still allows the user to understand what is happening in the media asset without having to be subjected to viewing the objectionable content.

In some embodiments, the media application may automatically, without user input, determine a particular object is objectionable and re-focus the default media asset frame or replace the default media asset frame with a light field frame so that the particular object is in focus. For example, the media application may reference a user profile, which contains information regarding whether or not to show objectionable objects in the media asset (e.g., bodily injuries, violence, nudity, drug use, immoral behavior, etc.). Using this information, the media application may customize the media asset that is displayed to the user based on the content control preferences.

In some embodiments, the media application may process the media asset (e.g., using object recognition technology), or data associated with the media asset (e.g., content descriptions, content ratings, subtitle data, user-generated data, data received via a social network, etc.), to determine the content or objects currently appearing in the progression of the media asset. The media application may then compare the objects currently appearing in the progression of the media asset to the user preferences in the user profile. Based on the comparison, the media application may process the media asset, and the light field frames corresponding to each frame of the media asset, to determine, without user input, particular objects to keep out of focus, including the duration, during the progression of the media asset.

It should be noted that frame 100 and/or 108 may appear on any of the devices shown and described in FIGS. 3 and 4. In addition, frame 108 may be generated/retrieved using one or more steps, or a combination of one or more steps, of the processes shown and described in FIGS. 7 and 8.

In some embodiments, the objects in focus (or out of focus) in the media asset may vary throughout the progression of the media asset. For example, in some embodiments, a default media asset frame, or series of default media asset frames, may be displayed. During the progression of the media application (e.g., after receiving a user input or upon determining that a user would likely prefer a different object to be in focus), the media application may modify or replace a default media asset frame to generate/display a light field frame featuring the object in an alternative focus.

To generate/determine the light field frame that corresponds to the default media asset frame which includes the object in the correct focus, the media application may interpret media data associated with the media asset. As used herein, "media data" refers to data about the media asset, including, but not limited to, the default media asset frames and the light field frames for the media asset. The media data may also include the objects, the positions of the objects, and the level of focus for each object in each default media asset frame and light field frame in the media asset. In addition, media data may include any data that may be compared to a user profile or content control settings to ensure the functionality of the media application (e.g., content descriptions, content ratings, subtitle data, user-generated data, and data received via a social network).

In some embodiments, the media data may be received and/or generated by the media application. For example, the media data may be generated at a headend and transmitted and/or stored with the media asset on local user equipment. In some embodiments, the media application may generate the data locally (e.g., using an object recognition module) during the progression of the media asset or at some other time. For example, the media data may be streamed to the media application implemented on user equipment for use in making real-time determinations about what light field frame corresponds to a particular default media asset frame.

Users may access media assets and the media application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiples of the same type of processing units (e.g., two Intel Core i7 processors) or multiple different processors (e.g., an Intel Core i5 processor and an Intel Core i7 processor). In some embodiments, control circuitry 304 executes instructions for a media application stored in memory (i.e., storage 308). Specifically, control circuitry 304 may be instructed by the media application to perform the functions discussed above and below. For example, the media application may provide instructions to control circuitry 304 to generate frames 100 and 108 (FIG. 1). In some implementations, any action performed by control circuitry 304 may be based on instructions received from the media application and/or media data.

Control circuitry 304 may also instruct a plenoptic content capture module incorporated into or accessible by the media application. The plenoptic content capture module may be capable of capturing 4D light field information for an image or video. For example, the plenoptic content capture module may be capable of capturing and processing light fields (e.g., light fields 504 (FIG. 5)) to determine, store, and/or process the various orientations of the light fields. The plenoptic content capture module may use any means necessary to receive the 4D light field, including, but not limited to, receiving information directly from a video/image sensor behind a microlens array (e.g., as discussed below in relation to FIG. 5). For example, in some embodiments, a video/image sensor may capture data regarding the magnitude and vector of light fields impacting the video/image sensor. The light fields may include light fields associated with objects that are not in focus.

The captured magnitude and vector data may be used by the media application (e.g., via instructions from control circuitry 304 to an incorporated plenoptic content capture module) to determine the depth of the objects that are not in focus, and through subsequent processing, re-focus the image and/or video on the objects. By using the plenoptic content capture module, the media application may increase (or decrease) the focus on different objects while the media asset is progressing, allowing a user to more easily track, or focus on, the object, or decrease the focus on objects, while the media asset is progressing to block or cloud the display of the object from being seen by a user.

For example, in some embodiments, the media application (e.g., using control circuitry 304) may process the media asset to determine particular objects to keep in, or out, of focus (or a particular level of focus) based on a user input or selection (e.g., via user input interface 310). For example, in some embodiments, a media application may receive a user selection of an object (e.g., a player in a televised football game) that the user wishes to remain in focus, irrespective of what is in focus in the default frame of the media asset. The media application may (e.g., via control circuitry 304) maintain the focus on the particular player (e.g., by selecting, and displaying in progression, corresponding light field frames featuring the object in the selected focus) to allow the user to more easily track or view the player during the progression of the media asset.

For example, using a plenoptic content capture module, incorporated into, or instructed by, control circuitry 304, the media application may generate/receive a data structure (e.g., data structure 600 (FIG. 6)) describing the contents of a default media asset frame and/or light field frame (e.g., the position and level of focus of various objects in each default media asset frame and/or light field frame). The media application may use the information contained in the data structure to arrange the default media asset frames and/or light field frames into a series to produce a video, which includes a user selected amount of focus on various objects appearing in the default media asset frames and/or light field frames (e.g., as discussed below in relation to FIGS. 7-9).

In client-server based embodiments, control circuitry 304 may include communications circuitry suitable for communicating with a media application server or other networks or servers. The instructions for carrying out the above-mentioned functionality may be stored on the media application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media information, described above, and media application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive media data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The media application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media application is a client-server based application. Data for use by a thick or thin client implemented on user equipment device 300 is retrieved on-demand by issuing requests to a server remote to the user equipment device 300. In one example of a client-server based media application, control circuitry 304 runs a web browser that interprets web pages provided by a remote server.

In some embodiments, the media application is downloaded and interpreted or otherwise run by an interpreter or virtual machine (run by control circuitry 304). In some embodiments, the media application may be encoded in the ETV Binary Interchange Format (EBIF), received by control circuitry 304 as part of a suitable feed, and interpreted by a user agent running on control circuitry 304. For example, the media application may be an EBIF application. In some embodiments, the media application may be defined by a series of JAVA-based files that are received and run by a local virtual machine or other suitable middleware executed by control circuitry 304. In some of such embodiments (e.g., those employing MPEG-2 or other digital media encoding schemes), the media application may be, for example, encoded and transmitted in an MPEG-2 object carousel with the MPEG audio and video packets of a program.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media application may be implemented, may function as a stand-alone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media application may have the same layout on various different types of user equipment or may be tailored to the display capabilities of the user equipment. For example, on user computer equipment 404, the media application may be provided as a website accessed by a web browser. In another example, the media application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and displaying preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media application settings across in-home devices and remote devices. Settings include those described herein, as well as channel and program favorites, programming preferences that the media application utilizes to make programming recommendations, display preferences, and other desirable media settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the media experience on another user equipment device, regardless of whether they are the same or a different type of user equipment device. In addition, the changes made may be based on settings input by a user, as well as user activity monitored by the media application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that, in the exemplary embodiment shown in FIG. 4, it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media data source 418 coupled to communications network 414 via communication paths 420 and 422, respectively. Paths 420 and 422 may include any of the communication paths described above in connection with paths 408, 410, and 412. Communications with the content source 416 and media data source 418 may be exchanged over one or more communications paths, but are shown as a single path in FIG. 4 to avoid overcomplicating the drawing. In addition, there may be more than one of each of content source 416 and media data source 418, but only one of each is shown in FIG. 4 to avoid overcomplicating the drawing. (The different types of each of these sources are discussed below.) If desired, content source 416 and media data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media data source 418 may provide media data, such as the media data described above. Media application data may be provided to the user equipment devices using any suitable approach. In some embodiments, the media application may be a stand-alone interactive television program guide that receives program guide data via a data feed (e.g., a continuous feed or trickle feed). Program schedule data and other media data may be provided to the user equipment on a television channel sideband, using an in-band digital signal, using an out-of-band digital signal, or by any other suitable data transmission technique. Program schedule data and other media data may be provided to user equipment on multiple analog or digital television channels.

In some embodiments, media data from media data source 418 may be provided to users' equipment using a client-server approach. For example, a user equipment device may pull media data from a server, or a server may push media data to a user equipment device. In some embodiments, a media application client residing on the user's equipment may initiate sessions with source 418 to obtain media data when needed, e.g., when the media data is out of date or when the user equipment device receives a request from the user to receive data. Media data may be provided to the user equipment with any suitable frequency (e.g., continuously, daily, a user-specified period of time, a system-specified period of time, in response to a request from user equipment, etc.). Media data source 418 may provide user equipment devices 402, 404, and 406 the media application itself or software updates for the media application.

Media applications may be, for example, stand-alone applications implemented on user equipment devices. For example, the media application may be implemented as software or a set of executable instructions which may be stored in storage 308, and executed by control circuitry 304 of a user equipment device 300. In some embodiments, media applications may be client-server applications where only a client application resides on the user equipment device, and server application resides on a remote server. For example, media applications may be implemented partially as a client application on control circuitry 304 of user equipment device 300 and partially on a remote server as a server application (e.g., media data source 418) running on control circuitry of the remote server. When executed by control circuitry of the remote server (such as media data source 418), the media application may instruct the control circuitry to generate the media application displays and transmit the generated displays to the user equipment devices. The server application may instruct the control circuitry of the media data source 418 to transmit data for storage on the user equipment. The client application may instruct control circuitry of the receiving user equipment to generate the media application displays.

Content and/or media data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media data described above. In addition to content and/or media data, providers of OTT content can distribute media applications (e.g., web-based applications or cloud-based applications), or the content can be displayed by media applications stored on the user equipment device.

Media system 400 is intended to illustrate a number of approaches, or network configurations, by which user equipment devices and sources of content and media data may communicate with each other for the purpose of accessing content and providing media data. The embodiments described herein may be applied in any one or a subset of these approaches, or in a system employing other approaches for delivering content and providing media data. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media information or settings to be communicated between the different user equipment devices. For example, it may be desirable for users to maintain consistent media application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media data. For example, some users may have home networks that are accessed by in-home and mobile devices. Users may control in-home devices via a media application implemented on a remote device. For example, users may access an online media application on a website via a personal computer at their office, or a mobile device such as a PDA or web-enabled mobile telephone. The user may set various settings (e.g., recordings, reminders, or other settings) on the online media application to control the user's in-home equipment. The online guide may control the user's equipment directly, or by communicating with a media application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media application to communicate directly with content source 416 to access content. Specifically, within a home, users of user television equipment 402 and user computer equipment 404 may access the media application to navigate among and locate desirable content. Users may also access the media application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
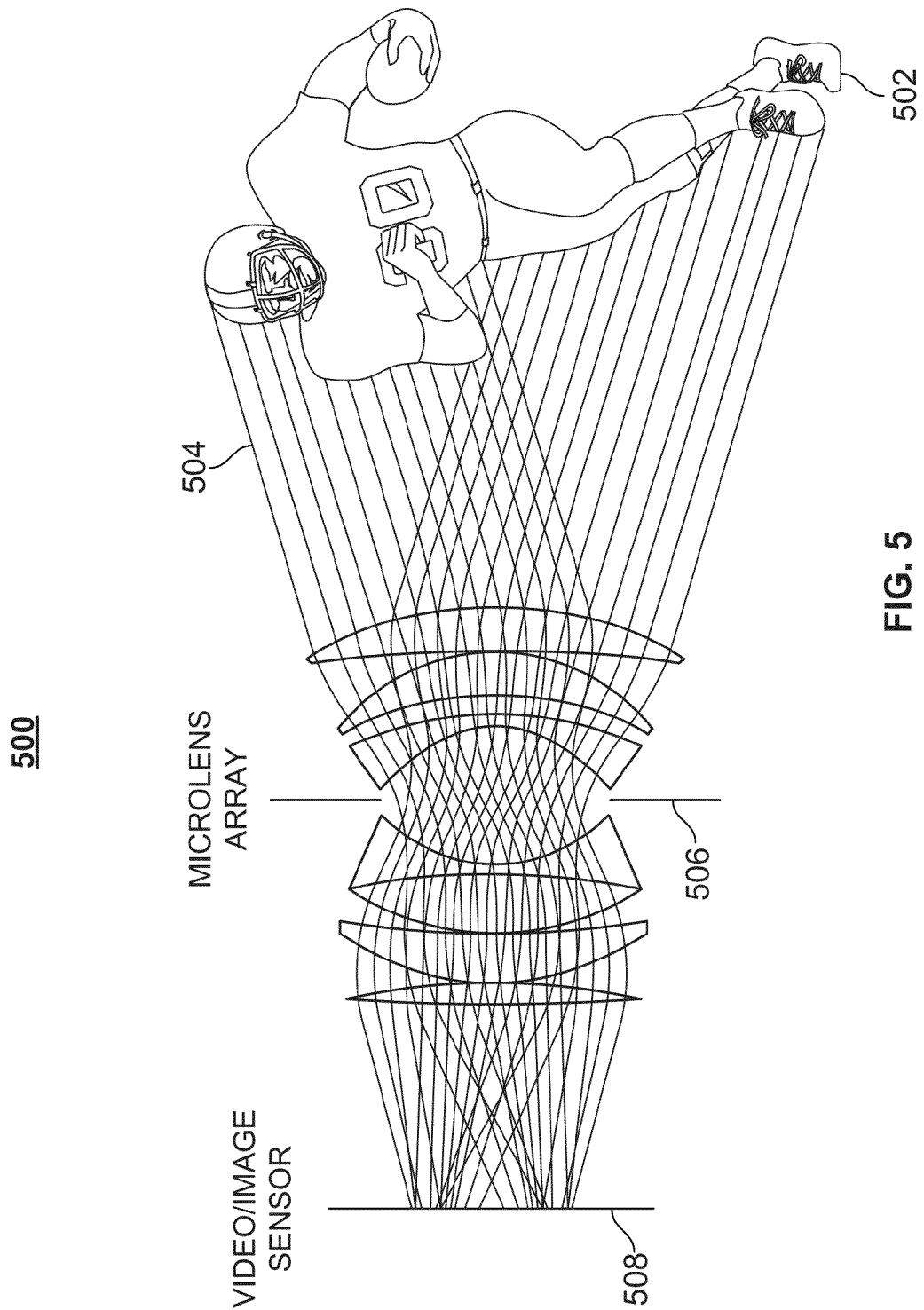
FIG. 5 is an illustrative diagram of a plenoptic content capture device used to create a media asset in accordance with some embodiments of the disclosure.

FIG. 5 is an illustrative diagram of a plenoptic content capture device used to create a media asset in accordance with some embodiments of the disclosure. In some embodiments, system 500 may be incorporated or accessible by the media application. For example, in some embodiments, video/image sensor 508 may be incorporated and/or accessible to the media application (e.g., via a plenoptic content control module incorporated into, and/or accessible by, control circuitry 304 (FIG. 3)). In FIG. 5, system 500 shows object 502, which, in some embodiments, may correspond to object 102 (FIG. 1), being recorded using a plenoptic content capture device. For example, light fields 504 originating at object 502 are transmitted through microlens array 506. After passing through microlens array 506, light fields 504 are captured by video/image sensor 508.

The captured light fields 504 may be used by a processing application (e.g., at content source 416 (FIG. 4) or media data source 418 (FIG. 4)) to generate a plurality of images and/or videos of object 502 from various focal points. In some embodiments, the plurality of images and/or videos of object 502 from various focal points are processed (e.g., at content source 416 (FIG. 4) or media data source 418 (FIG. 4)) to generate the default media asset frames and the light field frames for a media asset. The processing application may then determine, via an object recognition application, the media data for the media asset, including, but not limited to, the various objects, the positions of those objects, and the level of focus of each of those objects in each default media asset frame and the light field frame for the media asset.

In some embodiments, the media asset, including the default media asset frames and the light field frames, may be transmitted to the media application from content source 416 (FIG. 4), and the media data, describing the content of each of the default media asset frames and the light field frames, may be transmitted to the media application from media data source 418 (FIG. 4). In some embodiments, the media asset and media data may be transmitted together from either the content source 416 (FIG. 4) or media data source 418 (FIG. 4). In addition, in some embodiments, the media data may be transmitted in a data structure (e.g., in data structure 600 (FIG. 6)). The media application may use the transmitted data structure to determine the light field frame corresponding to a particular default media asset frame and having a particular level of focus for an object (e.g., object 102 (FIG. 1)) selected by a user (e.g., via user input interface 310 (FIG. 3)).

It should be noted that other suitable methods for receiving/generating plenoptic images/videos are fully within the content of this disclosure. System 500 should be considered exemplary and not limiting.

FIG. 6 is an illustrative data structure of data that describes a frame of the media asset, including the objects and positions of the objects in the frame in accordance with some embodiments of the disclosure. In some embodiments, the media application implemented on user equipment 402, 404, and/or 406 may receive and process data structure 600 from content source 416 (FIG. 4), media data source 418 (FIG. 4), or any other device or location accessible via communication network 414 (FIG. 4). For example, data structure 600 includes a plurality of fields of code. In some embodiments, the presence of a particular value or values in data structure 600 may indicate the presence and position of an object (e.g., object 102 (FIG. 1)) in a default media asset frame or a light field frame as well as whether or not the object is in focus. Additionally or alternatively, the fields of code may indicate information about the media asset, the progression of the media asset, the date and/or time of the media asset, and/or any other details about the media asset, a default media asset frame, a light field frame required by the media application for proper functioning.

In some embodiments, data structure 600 may be generated by the media application (e.g., using object recognition technology) at the user equipment. Additionally or alternatively, data structure 600 may be generated at content source 416 (FIG. 4) or media data source 418 (FIG. 4). In some embodiments, data structure 600 (and other data structures corresponding to other default media assets frames and light field frames) may be stored at content source 416 (FIG. 4) or media data source 418 (FIG. 4). Upon receipt of a user selection (e.g., via user input interface 310 (FIG. 3)), the media application may instruct control circuitry 304 (FIG. 3) to retrieve the stored data structures from content source 416 (FIG. 4), media data source 418 (FIG. 4), or any other location accessible via the communications network 414 (FIG. 4).

Data structure 600 includes fields 602 through 634. Field 602 identifies the light field frame to the media application. For example, in some embodiments, upon receiving a user selection (e.g., via user input interface 310 (FIG. 3)) indicating that the user would like to focus on an object (e.g., object 102 (FIG. 1) in a display (e.g., frame 100 (FIG. 1)), the media application may process the data structures corresponding to the light field frames of the media asset to determine a particular light field frame in which the selected object has the selected amount of focus.

Field 604 indicates to the media application the current media asset. In some embodiments, this information may be used to store or categorize the various default media asset frames or light field frames (or information about the different frames) in a database (e.g., a database located on content source 416 (FIG. 4) or media data source 418 (FIG. 4)). Upon a request to access the data structure, as described above, the information in field 604 may be used to retrieve the particular light field frame.

Field 606 indicates to the media application the current progress of the media asset. For example, field 606 indicates that the current media asset is at the one-hour and thirty-four minute of progress. In some embodiments, the media application may use this information to determine whether or not the light field frame corresponds to the currently displayed default media asset (or another light field frame).

Field 608 indicates to the media application the date and/or time of the initial transmission and/or broadcast of the media asset. In some embodiments, this information may be used to store or categorize the various default media asset frames or light field frames (or information about the different frames) in a database (e.g., a database located on content source 416 (FIG. 4) or media data source 418 (FIG. 4)). Upon a request to access the data structure, as described above, the information in field 608 may be used to retrieve the particular light field frame.

Fields 610 through 632 indicates the various frame details of the light field frame. For example, fields 610 through 632 indicate the objects that appear in the frame. Fields 612 through 620 indicates that object one, which in some embodiments may correspond to object 102 (FIG. 1) in frame 108 (FIG. 1), has a player number of twenty-seven (e.g., as shown by field 614), is in focus (e.g., as shown by field 616), and the current coordinates of object one's position on the display screen (e.g., as shown by field 618).

For example, in some embodiments, the media application may use object recognition technology, including, but not limited to optical character recognition to identify a particular object. In some embodiments, for example, during a sports program, the media application may determine the particular players shown in each frame of the media asset to determine the default media asset frame or light field frame to display. For example, if a user has selected a particular player to follow during the program, the media application may determine whether or not the player is currently being displayed by processing the uniform numbers of each of the players. If the player is currently displayed, the media application may display a light field frame featuring the particular player in a selected focus. If the player is not currently displayed, the media application may display the default media asset frame.

Field 616 indicates to the media application whether or not object one is in focus. In some embodiments, field 616 may, alternatively or additionally, indicate a level of focus of object one. Whether or not object one is in focus may determine whether or not the light field frame corresponding to data structure 600 is displayed. For example, if a user selected (e.g., via user input 310 (FIG. 3)) to follow object one (e.g., by instructing the media application to maintain a particular focus on object one) during the media asset, the light field frame corresponding to data structure 600 may be displayed at the one-hour and thirty-four minute mark.

Field 618 indicates to the media application the position of object one. In data structure 600, the position of object one is expressed as a series of coordinates outlining object one in the light field frame corresponding to data structure 600. Additionally and/or alternatively, the position of an object may be determined via any suitable method (e.g., via tags or a chroma keyed compositing transmitted with the media asset). In some embodiments, the position of the object may be used by the media application to determine a selectable area through which a user may indicate the desire to track a particular object in the media asset. For example, using user input interface 310 (FIG. 3), a user may select a particular object during the display of the frame. A selection by the user at any point within the coordinate of field 618, may indicate to the media application the desire to track the object displayed in that part of the frame. Furthermore, the media application may determine the particular player (e.g., via the identifying information in field 614) represented by the object in the particular frame. Based on this determination, the media application may retrieve/display only default media asset frames and/or light field frames in which the selected player is shown in focus.

Field 622 through field 630 indicates the name (e.g., field 624), level of focus (e.g., field 626), and position (e.g., field 628) of object two in the light field frame corresponding to data structure 600. For example, data structure 600 may describe frame 108 (FIG. 1). In frame 108 (FIG. 1), object 102 (FIG. 1) may be described by fields 612 through 620 of data structure 600, whereas object 104 (FIG. 1) may be described by fields 622 through 630 of data structure 600.

Field 632 indicates to the media application the end of the frame details, and field 634 indicates to the media application the end of information corresponding to the particular light field frame. It should be noted that the data (e.g., represented by the various fields of code) displayed in data structure 600 is not limiting, and in some embodiments, the data as described in data structure 600 may be replaced or supplemented by other data as discussed in the disclosure. For example, in some embodiments, data structure 600 may contain the media data (e.g., content descriptions, content ratings, subtitle data, user-generated data, and data received via a social network) associated with all the frames of the media asset (e.g., both the default media asset frames and the light field frames).

Figure 7:
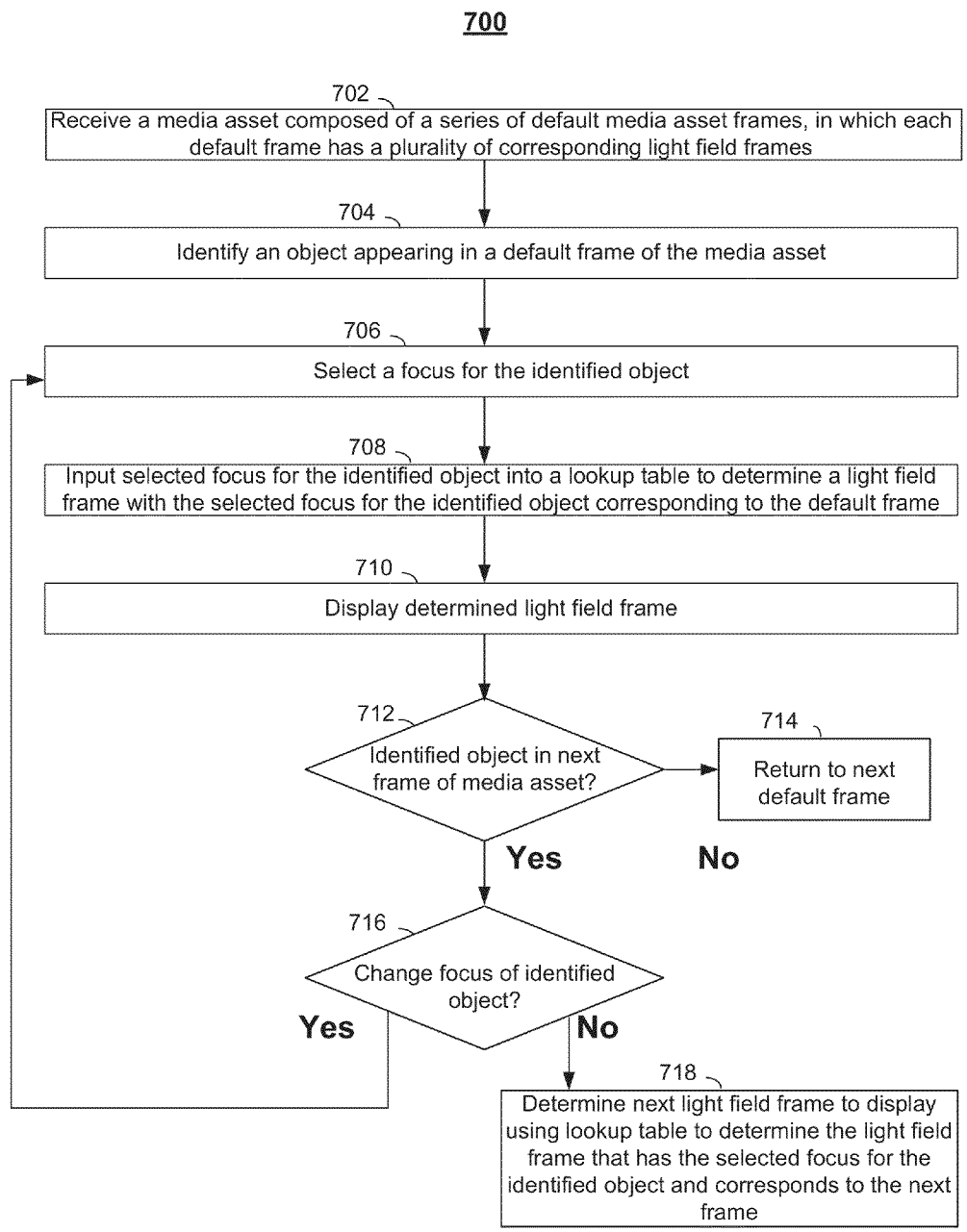
FIG. 7 is a flowchart of illustrative steps for determining the light field frame of a media asset that is to be displayed to a user in accordance with some embodiments of the disclosure.

FIG. 7 is a flowchart of illustrative steps for determining the light field frame of a media asset that is to be displayed to a user in accordance with some embodiments of the disclosure. Process 700 may be used to provide the displays as shown in FIGS. 1A-B and 2A-C. It should be noted that process 700 or any step thereof, could be displayed on, or provided by, any of the devices shown in FIGS. 3-4. For example, process 700 may be executed by control circuitry 304 (FIG. 3) as instructed by the media application.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method.

At step 702, the media application receives a media asset composed of a series of default media asset frames, in which each default media asset frame has a plurality of corresponding light field frames. For example, in some embodiments, the media application may be implemented on user equipment 402, 404, 406 (FIG. 4). The media application may receive the media asset from content source 416 (FIG. 4), media data source 418 (FIG. 4), and/or any device accessible to the communications network (FIG. 414).

At step 704, the media application identifies an object appearing in a default frame of the media asset. For example, the media application may determine the name, focus level, and position of all objects appearing in the current default media asset frame. For example, the media application may process media data (e.g., data structure 600) corresponding to the current default media asset frame stored in local storage (e.g., storage 308 (FIG. 3)) or retrieved from content source 416 (FIG. 4), media data source 418 (FIG. 4), and/or any device accessible to the communications network (FIG. 414). In some embodiments, identifying the objects in the current frame may occur at the user equipment (e.g., user equipment 402, 404, and/or 406 (FIG. 4)) via object recognition technology incorporated into, or an object recognition module accessed by, the media application (e.g., via instructions processed by control circuitry 304 (FIG. 3)).

At step 706, the media application selects a focus for an object identified in the current frame of the media asset. For example, a user may send instructions to control circuitry 304 (FIG. 3) using user input interface 310 (FIG. 3) that are received by the media application indicating that the user desires the identified object to have a particular level of focus. For example, the user may wish to more easily track the object (e.g., via maintaining the object in focus as the media asset progresses). In some embodiments, the selection of a focus for the identified object may occur automatically, and without user input. For example, the media application may determine that the identified object corresponds to the same entity (e.g., a football player) selected by the user earlier in the progression of the media asset (e.g., via processing field 614 (FIG. 6) of data structure 600 (FIG. 6) to determine the name corresponding to the object). The media application may therefore determine that the focus of the object should be set to the level previously determined by the user.

In another example, the selection of a focus for the identified object may occur automatically, and without user input based on a user profile and/or content control settings. For example, the user may have previously indicated to the media application to render all objectionable content out of focus or to replace default media asset frames featuring objectionable content/objects with corresponding light field frames in which the objects are out of focus.

In another example, the media application may process the media asset (e.g., using object recognition technology), or media data (e.g., included in data structure 600 (FIG. 6)) associated with the media asset such as content descriptions, content ratings, subtitle data, user-generated data, data received via a social network, to determine the content or objects currently appearing in the progression of the media asset. The media application may then compare the objects currently appearing in the progression of the media asset to the user preferences in the user profile. Based on the comparison, the media application may process the media asset, and the light field frames corresponding to each frame of the media asset, to determine, without user input, particular objects to keep in or out of focus (or at a particular level of focus), including for what duration during the progression of the media asset.

At step 708, the media application inputs the selected focus for the identified object into a lookup table to determine a light field frame with the selected focus for the identified object corresponding to the default frame. For example, upon receiving the selected focus, the media application may process the selected focus through a database (e.g., located locally on user equipment 402, 404, and/or 406 (FIG. 4) or remotely on content source 416 (FIG. 4), media data source 418 (FIG. 4), and/or a location accessible via communications network 414 (FIG. 4)) featuring media data (e.g., received in data structure 600 (FIG. 6)) to determine the particular default media asset frames and/or light field frames with the particular object at the particular level of focus.

In some embodiments, the media application may also determine a series of light fields frames to be shown. For example, the media guidance application may determine all of the light field frames that have the identified object in the selected focus. The media application may then replace/modify the default media asset frames as the media asset progresses with the series of light field frames to generate a customized media asset.

At step 710, the media application displays the determined light field frame corresponding to the selected focus. In some cases, the selected focus may occur in the default media asset frame; in which case, the media application may display the default media asset frame. For example, frame 108 (FIG. 1) may represent a light field frame displayed in response the media application changing the focus of the objects (e.g., object 102, object 104, and/or object 106 (FIG. 1)) in the frame.

At step 712, the media application determines whether or not the identified object is in the next frame of the media asset in the progression of the media asset. If so, the media application proceeds to step 716; if not, the media application proceeds to step 714. For example, the identified object may represent a player or objectionable content that does not appear in the next frame of the media asset. If the identified object does not appear in the next frame of the media asset as the media asset progresses, the media application returns to the next default media asset frame. In some embodiments, the appearance of the identified object in a later frame of the media asset as the media asset progresses may cause the media application to re-apply the selected focus. For example, during the progression of the media asset, for frames of the media asset in which the identified object appears, the media application may use corresponding light field frames featuring the selected focus, and in frames of the media asset in which the identified object does not appear, the media application may use a default media asset frame.

At step 716, the media application determines whether or not to change the focus of the identified object. If the media application does not change the focus of the identified object, the media application proceeds to step 718 and determines the next light field frame (or default media asset frame) to display using a lookup table to determine the light field frame (or default media asset frame) that has the selected focus for the identified object and corresponds to the next frame of the media asset.

If the media application does determine to change the focus of the identified asset, the media application returns to step 706. For example, in some embodiments, multiple objects may be selected and both objects cannot be viewed with the selected focus level. Therefore, the media application may select one of the object to display with the selected focus based on a priority (either determined by the user or automatically). In another example, the user may select to change the identified focus of the object. For example, the user may have only desired to highlight (e.g., via bring into focus) the object for a limited amount of time. In another example, the media application may determine (e.g., via a user profile or content control settings) that the identified object should no longer receive the selected level of focus. For example, the identified object may no longer be considered objectionable (e.g., a scene featuring bodily harm may have ended).

Figure 8:
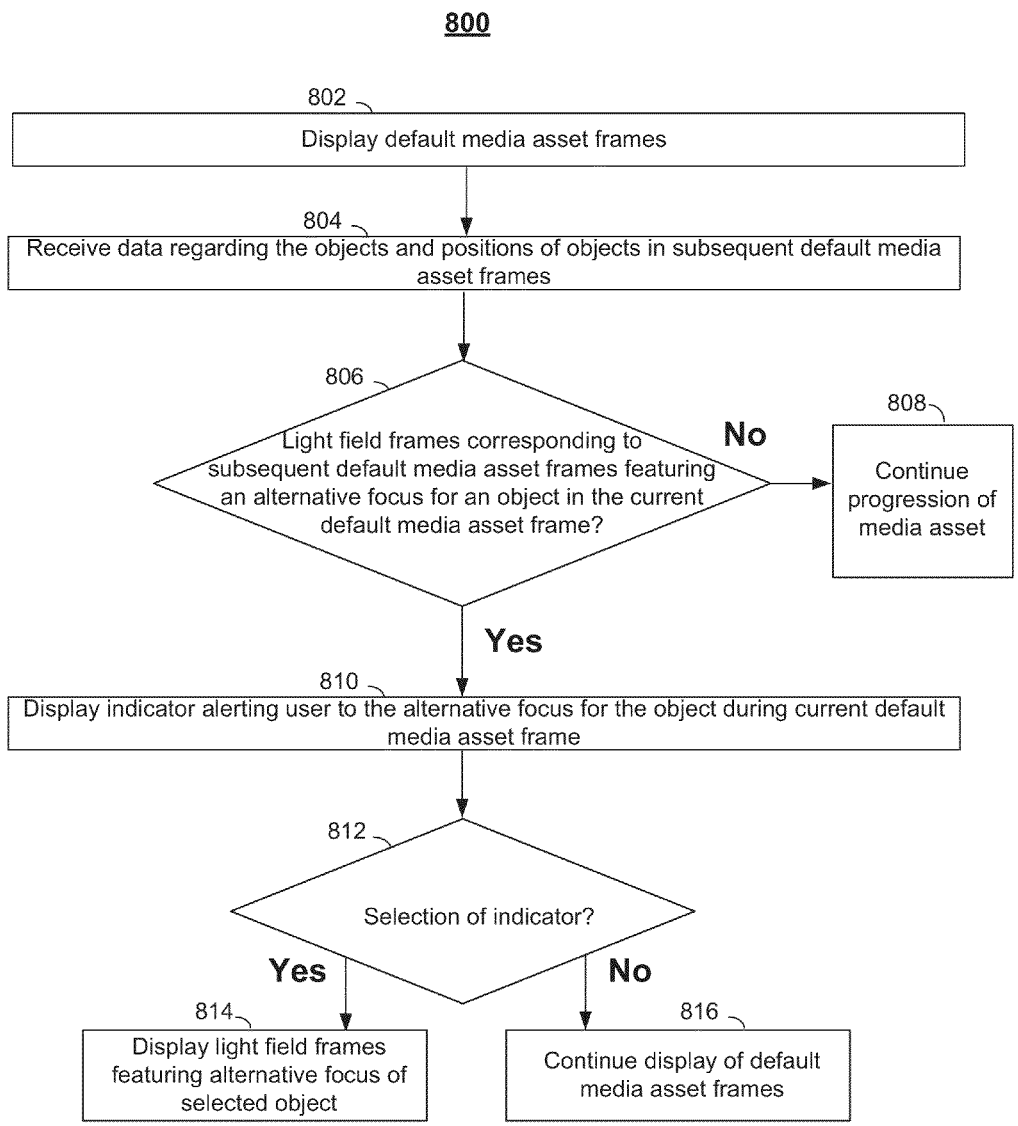
FIG. 8 is a flowchart of illustrative steps for selecting an object to display with an alternative focus in accordance with some embodiments of the disclosure.

FIG. 8 is a flowchart of illustrative steps for selecting an object to display with an alternative focus in accordance with some embodiments of the disclosure. Process 800 may be used to provide the displays as shown in FIGS. 1A-B and 2A-C. It should be noted that process 800 or any step thereof, could be displayed on, or provided by, any of the devices shown in FIGS. 3-4. For example, process 800 may be executed by control circuitry 304 (FIG. 3) as instructed by the media application.

At step 802, the media application displays a default media asset frame. For example, a default media asset frame may correspond to frame 100 (FIG. 1) as shown via display 312 (FIG. 3). In some embodiments, the media application may be implemented on user equipment 402, 404, 406 (FIG. 4). The media application may receive the media asset from content source 416 (FIG. 4), media data source 418 (FIG. 4), and/or any device accessible to the communications network (FIG. 414).

At step 804, the media application receives data regarding the objects and positions of objects in subsequent default media asset frames. For example, the media application may determine the name, focus level, and position of all objects appearing in the current default media asset frame. For example, the media application may process media data (e.g., data structure 600) corresponding to the current default media asset frame stored in local storage (e.g., storage 308 (FIG. 3)) or retrieved from content source 416 (FIG. 4), media data source 418 (FIG. 4), and/or any device accessible to the communications network (FIG. 414). In some embodiments, identifying the objects in the current frame may occur at the user equipment (e.g., user equipment 402, 404, and/or 406 (FIG. 4)) via object recognition technology incorporated into, or an object recognition module accessed by, the media application (e.g., via instructions processed by control circuitry 304 (FIG. 3)).

At step 806, the media application determines whether there are light field frames corresponding to subsequent default media asset frames featuring an alternative focus for an object in the current default media asset frame. For example, the media application may process the media data (e.g., data structure 600 (FIG. 6)) for each frame of the media asset (e.g., both default media asset frames and light field frames). Additionally or alternatively, the media application may reference a database (e.g., as described in step 708 (FIG. 7)) to determine if there are any light field frames that contain an object in the current default media asset frame with a different level of focus.

If the media application determines that there are not any light field frames corresponding to subsequent default media asset frames featuring an alternative focus for an object in the current default media asset frame, the media asset continues the progression of the media asset at step 808. If the media application determines that there are light field frames corresponding to subsequent default media asset frames featuring an alternative focus for an object in the current default media asset frame, the media asset continues displaying an indicator alerting a user to the alternative focus for the object during current default media asset frame at step 810. For example, if the media asset determines that there is an alternative focus available for object 104 (FIG. 1), the media application may highlight, provide an icon, or otherwise alert a user to the presence of light field frames with an alternative focus.

At step 812, the media application determines whether or not the user selected the indicator. For example, a user may send instructions to the media application via control circuitry 304 using user input interface 310. If the media application receives a selection of the indicator at step 812, the media application displays the light field frames featuring the alternative focus of the selected object at step 814. If the media application does not receives a selection of the indicator at step 812, the media application continues to display the progression of default media asset frames.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method.

Figure 9:
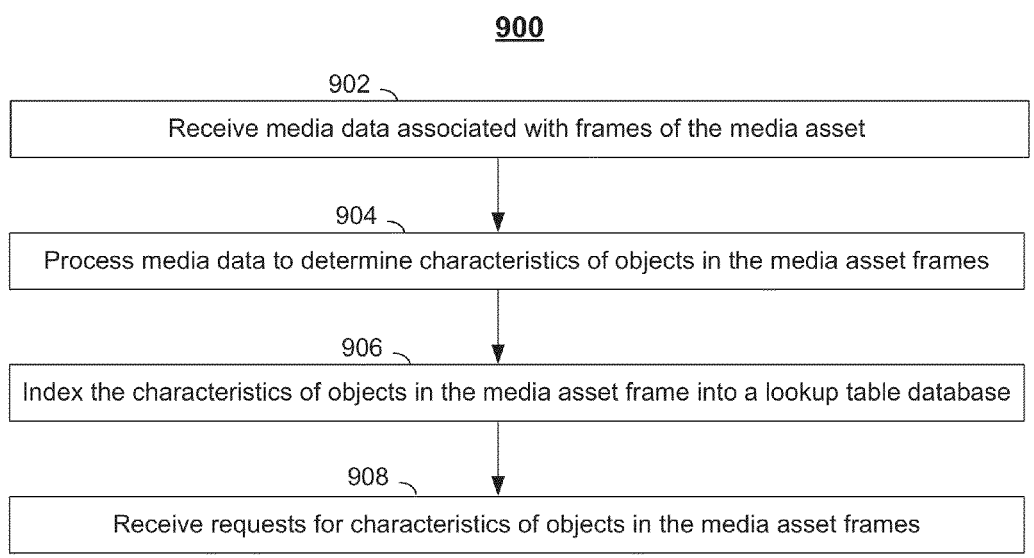
FIG. 9 is a flowchart of illustrative steps for indexing the characteristics of the objects in media asset frames into a lookup table database that may be accessed by the media application in accordance with some embodiments of the disclosure.

FIG. 9 is a flowchart of illustrative steps for indexing the characteristics of the objects in media asset frames into a lookup table database that may be accessed by the media application in accordance with some embodiments of the disclosure. Process 900 may be used to provide the displays as shown in FIGS. 1A-B and 2A-C. It should be noted that process 900 or any step thereof, could be displayed on, or provided by, any of the devices shown in FIGS. 3-4. For example, process 900 may be executed by control circuitry 304 (FIG. 3) as instructed by the media application.

In some embodiments, process 900 may be performed by the media application implemented on user equipment (e.g., user equipment 402, 404, and/or 408 (FIG. 4)). Additionally or alternatively, one or more step of process 900 may occur at a location remote from the media application and/or the user equipment. For example, in some embodiments, one or more step may occur on the content source 416 (FIG. 4) and/or media data source 418 (FIG. 4). For example, the lookup table database as described below in relation to step 906 may be located on a remote server. The media application may then send and received instructions/data regarding the media asset and/or characteristics of the objects in the media asset to the remote server.

At step 902, the media application receives media data associated with frames of the media asset. For example, the media application may receive a data structure (e.g., data structure 600 (FIG. 6)) corresponding to each default media asset frame and each light field frame for the media asset. In some embodiments, the media data may be received from a remote server (e.g., media data source 418 (FIG. 4)) and/or may be received from an object recognition module incorporated into (or separate from) the media application as described above.

At step 904, the media application processes the media data to determine characteristics of objects in each of the media asset frames. For example, as described above in relation to FIG. 6, media data associated with each frame in the media asset may include characteristics about the media asset, the progression of the media asset, the date and/or time of the media asset, and/or any other details about the media asset, a default media asset frame, a light field frame required by the media application for proper functioning. Additionally or alternatively, the media data may include characteristics regarding content descriptions, content ratings, subtitle data, user-generated data, and data received via a social network used by the media application to compare/determine the content of the frame of the media asset, characteristics that may be compared to a user profile and/or content control settings.

At step 906, the media application may index the characteristics of objects in the media asset frame into a lookup table database. The characteristics of the objects in the lookup table database may be sorted and filtered according to the different characteristics. For example, the database may be filtered to determine all of the frames of the media asset (e.g., both default media asset frames and light field frames) that contain a particular object at a particular level of focus or clarity).

At step 908, the media application may receive a request for characteristics of objects in the frame of the media asset. For example, the media application (e.g., via control circuitry 304 (FIG. 3)) may receive a request from a user for display (e.g., on display 312 (FIG. 3)) of the light field frame corresponding to a particular default media asset frame that has a particular level of focus for an object (e.g., object 102 (FIG. 1)) as selected by a user (e.g., via user input interface 310 (FIG. 3)). The media application may process the received characteristics to determine the light field frame having the requested characteristics (e.g., as described in relation to step 708 (FIG. 7)).

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for focusing on objects in media assets, the method comprising:
   receiving a media asset comprising a plurality of media asset frames, wherein each of the plurality of media asset frames is associated with a plurality of light field frames, and wherein each of the plurality of light field frames has different objects in focus;
   identifying an object appearing in each of the plurality of light field frames associated with a media asset frame of the plurality of media asset frames;
   determining a desired focus of the identified object;
   determining a light field frame of the plurality of light field frames, associated with the media asset frame, that has the object at the determined focus; and
   replacing the media asset frame with the light field frame.

2. The method of claim 1, wherein the determined focus of the identified object is in focus to a user.

3. The method of claim 1, wherein the determined focus of the identified object is out of focus to a user.

4. The method of claim 1, wherein determining the light field frame of the plurality of light field frames further comprises inputting the determined focus for the identified object into a lookup table to select the light field frame having the determined focus of the identified object.

5. The method of claim 1, further comprising comparing the identified object to a parental control database to determine the focus of the identified object.

6. The method of claim 1, further comprising comparing the identified object to a user profile to determine the focus of the identified object.

7. The method of claim 1, wherein identifying the object further comprises:
   determining a plurality of objects appearing in the plurality of light field frames;
   comparing each of the plurality of objects appearing in the plurality of light field frames to a user profile to determine a likelihood of user interest associated with each of the plurality of objects appearing in the plurality of light field frames; and
   selecting each of the plurality of objects associated with a threshold likelihood of user interest.

8. The method of claim 1, wherein identifying the object further comprises receiving a user input identifying the object.

9. The method of claim 1, wherein determining the focus of the identified object further comprises receiving a user input determining the focus of the object.

10. The method of claim 1, further comprising identifying the object based at least in part on processing data associated with the media asset, wherein the data associated with the media asset is selected from the group consisting of content descriptions, content ratings, subtitle data, user-generated data, and data received via a social network.

11. A system for focusing on objects in media assets, the system comprising control circuitry configured to:
   receive a media asset comprising a plurality of media asset frames, wherein each of the plurality of media asset frames is associated with a plurality of light field frames, and wherein each of the plurality of light field frames has different objects in focus;
   identify an object appearing in each of the plurality of light field frames associated with a media asset frame of the plurality of media asset frames;
   determine a desired focus of the identified object;
   determine a light field frame of the plurality of light field frames, associated with the media asset frame, that has the object at the determined focus; and
   replace the media asset frame with the light field frame.

12. The system of claim 11, wherein the determined focus of the identified object is in focus to a user.

13. The system of claim 11, wherein the determined focus of the identified object is out of focus to a user.

14. The system of claim 11, wherein determining the light field frame of the plurality of light field frames further comprises inputting the determined focus for the identified object into a lookup table to select the light field frame having the determined focus of the identified object.

15. The system of claim 11, wherein the control circuitry is further configured to compare the identified object to a parental control database to determine the focus of the identified object.

16. The system of claim 11, wherein the control circuitry is further configured to compare the identified object to a user profile to determine the focus of the identified object.

17. The system of claim 11, wherein identifying the object further comprises:
   determining a plurality of objects appearing in the plurality of light field frames;
   comparing each of the plurality of objects appearing in the plurality of light field frames to a user profile to determine a likelihood of user interest associated with each of the plurality of objects appearing in the plurality of light field frames; and
   selecting each of the plurality of objects associated with a threshold likelihood of user interest.

18. The system of claim 11, wherein identifying the object further comprises receiving a user input identifying the object.

19. The system of claim 11, wherein determining the focus of the identified object further comprises receiving a user input determining the focus of the object.

20. The system of claim 11, wherein the control circuitry is further configured to identify the object based, at least in part, on processing data associated with the media asset, wherein the data associated with the media asset is selected from the group consisting of content descriptions, content ratings, subtitle data, user-generated data, and data received via a social network.

* * * * *